(12) United States Patent
Shang

(10) Patent No.: US 9,880,349 B2
(45) Date of Patent: Jan. 30, 2018

(54) BACKLIGHT MODULE AND DISPLAY DEVICE FOR SIMPLE FIXATION OF LAMP BAR

(71) Applicants: BOE TECHNOLOGY GROUP CO., LTD., Beijing (CN); BOE Optical Science and Technology Co., Ltd., Suzhou (CN)

(72) Inventor: Gaowei Shang, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 15/231,829

(22) Filed: Aug. 9, 2016

(65) Prior Publication Data
US 2017/0192148 A1 Jul. 6, 2017

(30) Foreign Application Priority Data
Jan. 4, 2016 (CN) .......................... 2016 1 0003628

(51) Int. Cl.
*F21V 8/00* (2006.01)
(52) U.S. Cl.
CPC ............. *G02B 6/009* (2013.01); *G02B 6/005* (2013.01); *G02B 6/0055* (2013.01); *G02B 6/0088* (2013.01)
(58) Field of Classification Search
CPC .. G02B 6/0088; G02B 6/0068; G02B 6/0026; G02B 6/0055
See application file for complete search history.

(56) References Cited

U.S. PATENT DOCUMENTS

2016/0273740 A1* 9/2016 Que .................... G02F 1/1335

FOREIGN PATENT DOCUMENTS

| CN | 203810290 U | 9/2014 |
|----|-------------|--------|
| CN | 204028521 U | 12/2014 |
| CN | 104375233 A | 2/2015 |
| CN | 104456302 A | 3/2015 |
| CN | 105090892 A | 11/2015 |
| CN | 105116606 A | 12/2015 |

OTHER PUBLICATIONS

First Office Action dated Jul. 17, 2017 in corresponding Chinese Patent Application No. 201610003628.6.

* cited by examiner

*Primary Examiner* — Joseph L Williams
(74) *Attorney, Agent, or Firm* — Nath, Goldberg & Meyer; Joshua B. Goldberg

(57) ABSTRACT

The present invention discloses a backlight module and a display device, wherein the backlight module includes a light guide plate and a lamp bar, the lamp bar includes a flexible printed circuit board and several LED lamps fixed onto the flexible printed circuit board, wherein at least one position avoiding slot is provided in an edge region of the light guide plate, the LED lamps are located inside the position avoiding slot, and the flexible printed circuit board is located above the light guide plate and fixedly attached to a position of the position avoiding slot. The technical solution of the present invention can achieve fixing the lamp bar without providing an assembly module, which can effectively reduce a total weight of a display device, and meanwhile be advantageous to a narrow-bezel design of the display device.

20 Claims, 2 Drawing Sheets

BACKLIGHT MODULE AND DISPLAY DEVICE FOR SIMPLE FIXATION OF LAMP BAR

TECHNICAL FIELD

The present invention relates to the field of display technology, and in particular relates to a backlight module and a display device.

BACKGROUND

FIG. 1 is a schematic cross-sectional diagram of a display device in the prior art. As shown in FIG. 1, the display device includes: an assembly module and a backlight module, the assembly module includes a plastic frame 2 and a frame 1, and the backlight module includes a lamp bar 3, a light guide plate 6, a reflector sheet 7 and an optical film layer 8. The lamp bar 3 includes a flexible printed circuit (FPC) board 4 and several LED lamps 5 fixed onto the flexible printed circuit board 4, wherein the flexible printed circuit board 4 is adhered to a side surface of the plastic frame 1, or adhered to an upper surface of the frame (the case that the flexible printed circuit board 4 is adhered to an upper surface of a back plate is not shown in the figure), so as to fix the lamp bar 3.

In the prior art, the existence of the assembly module plays a crucial effect on fixing the lamp bar in the backlight module. However, due to the existence of the assembly module, a total weight of the display device is relatively large, and meanwhile it is disadvantageous to realizing a narrow bezel of the display device.

SUMMARY

The present invention provides a backlight module and a display device, which can realize fixation of a lamp bar without providing an assembly module.

In order to achieve the above objective, the present invention provides a backlight module, comprising a light guide plate and a lamp bar, the lamp bar comprising a flexible printed circuit board and a plurality of LED lamps fixed onto the flexible printed circuit board, wherein at least one position avoiding slot is provided in an edge region of the light guide plate, the LED lamps are located inside the position avoiding slot, and the flexible printed circuit board is located above the light guide plate and fixed to a peripheral position of the position avoiding slot.

Optionally, the backlight module further comprises an optical film layer provided above the light guide plate.

Optionally, a position defining structure is provided at a peripheral position of the optical film layer, and the position defining structure is used for preventing the optical film layer from moving.

Optionally, all of the position avoiding slot(s) is/are provided at one side of the edge region of the light guide plate, and the position defining structure is provided at other three sides of the edge region of the light guide plate.

Optionally, the position defining structure and the light guide plate are formed integrally.

Optionally, the backlight module further comprises a shading tape covering a side surface of the light guide plate.

Optionally, the shading tape also covers an edge region of the optical film layer.

Optionally, the backlight module further comprises a reflector sheet, wherein the reflector sheet is provided beneath the light guide plate, and a reflector sheet fixing glue is provided between the reflector sheet and the light guide plate.

Optionally, the number of the position avoiding slots is equal to the number of the LED lamps, and each of the LED lamps is disposed in a position avoiding slot at a corresponding position.

Optionally, a circuit board fixing glue is provided between the flexible printed circuit board and the light guide plate.

In order to achieve the above objective, the present invention also provides a display device, comprising a backlight module, which is the above backlight module.

The present invention has advantageous effects as follows:

The present invention provides a backlight module and a display device, wherein the backlight module includes a light guide plate and a lamp bar, and the lamp bar includes a flexible printed circuit board and several LED lamps fixed onto the flexible printed circuit board. At least one position avoiding slot is provided in an edge region of the light guide plate, the LED lamps are provided inside the position avoiding slot, and the flexible printed circuit board is located above the light guide plate and fixed to a peripheral position of the position avoiding slot. The technical solution of the present invention can achieve fixing the lamp bar without providing an assembly module, which can effectively reduce a total weight of a display device, and meanwhile be advantageous to a narrow-bezel design of the display device.

DETAILED DESCRIPTION

In order to provide a better understanding of the technical solutions of the present invention to those skilled in the art, a backlight module and a display device provided by the invention are described in detail below in conjunction with the drawings.

Embodiment 1

Figure 1:
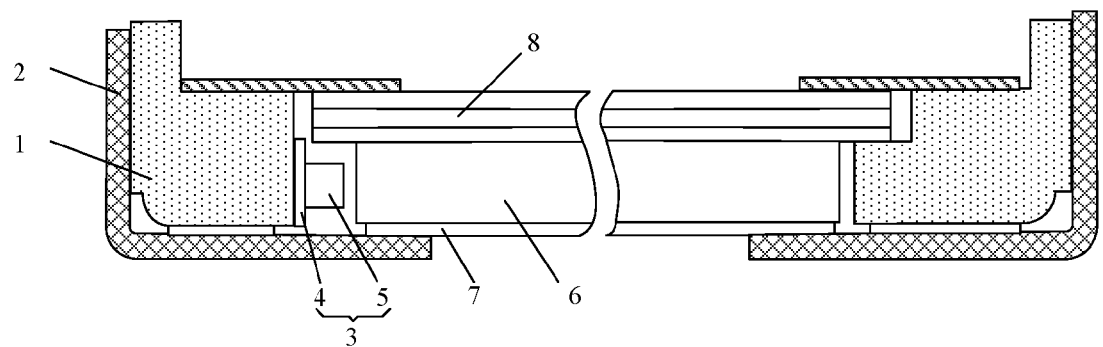
FIG. 1 is a schematic cross-sectional diagram of a display device in the prior art.
Figure 2:
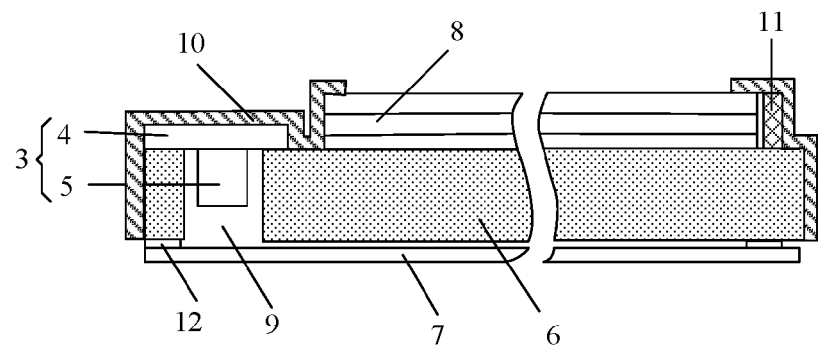
FIG. 2 is a schematic cross-sectional diagram of a backlight module provided by Embodiment 1 of the present invention.

FIG. 2 is a schematic cross-sectional diagram of a backlight module provided by Embodiment 1 of the present invention. As shown in FIG. 2, the backlight module includes a light guide plate 6 and a lamp bar 3. The lamp bar 3 includes a flexible printed circuit board 4 and several LED lamps 5 fixed onto the flexible printed circuit board 4. At least one position avoiding slot 9 is provided in an edge region of the light guide plate 6, the LED lamps 5 are located inside the position avoiding slot 9, and the flexible printed circuit board 4 is located above the light guide plate 6 and fixedly attached to a position of the position avoiding slot 9.

The technical solution of the present invention provides the position avoiding slot 9 in an edge region of the light guide plate 6, and places the LED lamps 5 in the position avoiding slot 9, while fixing the flexible printed circuit board 4 to a peripheral position of the position avoiding slot 9, so that the LED lamps 5 are fixed inside the position avoiding slot 9. The technical solution of the present invention achieves fixing the lamp bar 3 without providing an assembly module.

Optionally, circuit board fixing glue (not shown in the figure) may be provided between the flexible printed circuit board 4 and the light guide plate 6. The circuit board fixing glue may achieve fixedly attaching the flexible printed circuit board 4 to the position of the position avoiding slot 9. Of course, the flexible printed circuit board 4 in the present embodiment may be fixed to the peripheral position of the position avoiding slot 9 by other means, for example, by single/double-sided adhesive tape, and the like, which are not enumerated herein.

Figure 3:
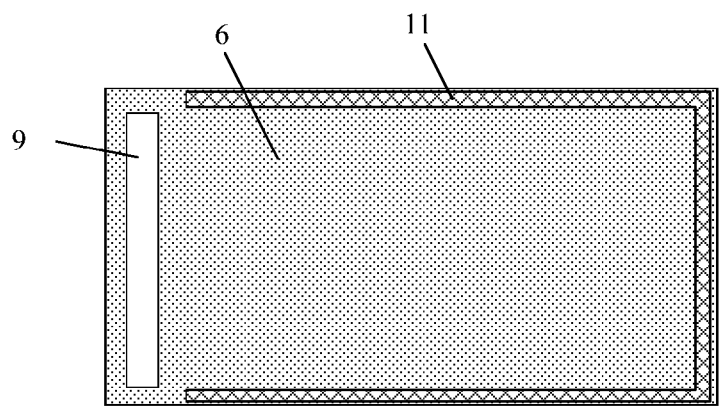
FIG. 3 is a schematic plan view of a light guide plate in the present invention.

FIG. 3 is a schematic plan view of a light guide plate in the present invention. As shown in FIG. 3, only one position avoiding slot 9 is provided in the edge region of the light guide plate 6, and in this case, all of the LED lamps 5 may be provided inside the position avoiding slot 9.

Figure 4:
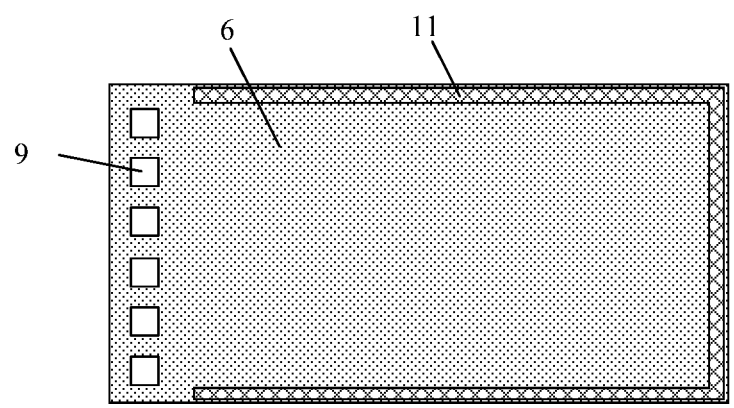
FIG. 4 is a schematic plan view of another light guide plate in the present invention.

FIG. 4 is a schematic plan view of another light guide plate in the present invention. As shown in FIG. 4, multiple position avoiding slots 9 are provided in the edge region of the light guide plate 6. Preferably, the number of the position avoiding slots 9 may be equal to the number of the LED lamps 5, and each LED lamp 5 is correspondingly placed in one position avoiding slot 9. In this case, a contact area between the flexible printed circuit board 4 and the light guide plate 6 can be effectively increased, and further firmness of the fixation between the flexible printed circuit board 4 and the light guide plate 6 can be effectively ensured. It is to be noted that the case in which the position avoiding slot(s) 9 is/are located at one side of the light guide plate 6 in FIGS. 3 and 4 only serves as an example. It should be known to those skilled in the art that the position avoiding slot(s) 9 in the present invention can be located at one or more sides of the light guide plate 6, and corresponding lamp bar(s) 3 can be disposed at one or more sides of the light guide plate 6, and specific cases are not described in detail herein.

Furthermore, a depth of the position avoiding slot 9 on the light guide plate 6 in the present embodiment only needs to be greater than or equal to a total height of the LED lamps 5, and therefore, the position avoiding slot 9 may be a concave slot or a through slot.

Optionally, the backlight module also includes an optical film layer 8, which is provided above the light guide plate 6. The optical film layer 8 successively includes, from top to bottom, an upper prism sheet, a lower prism sheet and a diffuser sheet. The optical film layer 8 can effectively increase an axial brightness of light exiting from the light guide plate 6.

In the present embodiment, in order to prevent the optical film layer 8 from moving, optionally, a position defining structure 11 may be provided at a peripheral position of the optical film layer 8, and is used for defining a position of the optical film layer 8 above the light guide plate 6. In the present embodiment, the position of the optical film layer 8 can be defined by providing the position defining structure 11, so as to effectively prevent the position offset of the optical film layer 8.

As one optional implementation of the present embodiment, when all of the position avoiding slots 9 are located at one side of the edge region of the light guide plate 6, the position defining structure 11 is located at the other three sides of the edge region of the light guide plate 6, and in this case, the position defining structure 11 on the light guide plate 6 may present a U-shaped arrangement (refer to FIGS. 3 and 4), so as to define the position of the optical film layer 8.

In the above solution, the reason for not providing the position defining structure 11 on the side corresponding to the position avoiding slot 9 is that, if the position defining structure 11 is provided around the position avoiding slot 9, a part of light generated by the LED lamps 5 may transmit onto the position defining structure 11 directly through the light guide plate 6, and if the position defining structure 11 is formed of a transparent material, the light transmitting onto the position defining structure 11 may pass through the position defining structure 11, resulting in light leakage of the backlight module. Thus, the technical solution in which the position defining structure 11 is not provided at the side corresponding to the position avoiding slot 9 can effectively reduce a risk of light leakage of the backlight module.

Optionally, the position defining structure 11 and the light guide plate 6 in the present embodiment may be formed integrally.

In practical applications, due to the absence of an assembly module around the light guide plate 6, a part of light may transmit out of the light guide plate 6 from all sides, resulting in a light leakage phenomenon.

To solve this technical problem, the technical solution of the present invention provides a shading tape 10 on a side surface of the light guide plate 6, so as to effectively prevent light from transmitting out of the side surface of the light guide plate 6. In the present embodiment, preferably, a side of the shading tape 10 facing the light guide plate 6 may be painted white, and a side thereof away from the light guide plate 6 may be painted black. The surface painted white can effectively reflect light emitted out from the side surface of the light guide plate 6 back into the light guide plate 6, thereby effectively increasing brightness of light emitted from a front surface of the light guide plate 6.

Optionally, the shading tape 10 covering the side surface of the light guide plate 6 also extends to an edge region of the optical film layer 8, and covers the edge region of the optical film layer 8. In this case, the shading tape 10 can not only realize a shading function, but also fix the optical film layer 8 to the light guide plate 6, thereby effectively preventing the position offset of the optical film layer 8.

In addition, in order to further increase the brightness of light emitted from the front surface of the light guide plate 6, a reflector sheet 7 may be provided beneath the light guide plate 6, with a reflector sheet fixing glue 12 provided between the reflector sheet 7 and the light guide plate 6. Here, to reduce an influence of the reflector sheet fixing glue 12 on a reflecting effect of the reflector sheet 7, the reflector sheet fixing glue 12 may be located in an edge region of the reflector sheet 7.

Embodiment 1 of the present invention provides a backlight module, which includes a light guide plate and a lamp bar, and the lamp bar includes a flexible printed circuit board and several LED lamps fixed onto the flexible printed circuit board. At least one position avoiding slot is provided in an edge region of the light guide plate, the LED lamps are provided inside the position avoiding slot, and the flexible printed circuit board is located above the light guide plate and fixed to a peripheral position of the position avoiding slot. The technical solution of the present invention can achieve fixing the lamp bar without providing an assembly module, which can effectively reduce a total weight of a display device, and meanwhile be advantageous to a narrow-bezel design of the display device.

Embodiment 2

Embodiment 2 of the present invention provides a display device. The display device includes a backlight module, which is the backlight module described in the above Embodiment 1, details of which can be found by referring to the content of the above Embodiment 1, and are not repeated herein. It is to be noted that there is no need to provide an assembly module in the display device provided by the present embodiment.

Embodiment 2 of the present invention provides a display device including a backlight module, which includes a light guide plate and a lamp bar, and the lamp bar includes a flexible printed circuit board and several LED lamps fixed onto the flexible printed circuit board. At least one position avoiding slot is provided in an edge region of the light guide plate, the LED lamps are provided inside the position avoiding slot, and the flexible printed circuit board is located above the light guide plate and fixed at a peripheral position of the position avoiding slot. The technical solution of the present invention can achieve fixing the lamp bar without providing an assembly module, which can effectively reduce a total weight of a display device, and meanwhile be advantageous to a narrow-bezel design of the display device It can be understood that the foregoing implementations are merely exemplary implementations used for describing the principle of the present invention, but the present invention is not limited thereto. Those of ordinary skill in the art may make various variations and modifications without departing from the spirit and essence of the present invention, and these variations and modifications shall fall into the protection scope of the present invention.

The invention claimed is:

1. A backlight module, comprising a light guide plate and a lamp bar, the lamp bar comprising a flexible printed circuit board and a plurality of LED lamps fixed onto the flexible printed circuit board, wherein at least one position avoiding slot is provided in an edge region of the light guide plate, the LED lamps are located inside the position avoiding slot, and the flexible printed circuit board is located above the light guide plate and fixedly attached to a position of the position avoiding slot.

2. The backlight module according to claim 1, further comprising an optical film layer provided above the light guide plate.

3. The backlight module according to claim 2, wherein a position defining structure is provided at a peripheral position of the optical film layer, and the position defining structure is used for preventing the optical film layer from moving.

4. The backlight module according to claim 3, wherein all of the position avoiding slot(s) is/are provided at one side of the edge region of the light guide plate, and the position defining structure is provided at other three sides of the edge region of the light guide plate.

5. The backlight module according to claim 3, wherein the position defining structure and the light guide plate are formed integrally.

6. The backlight module according to claim 2, further comprising a shading tape covering a side surface of the light guide plate.

7. The backlight module according to claim 6, wherein the shading tape also covers an edge region of the optical film layer.

8. The backlight module according to claim 1, further comprising a reflector sheet, wherein the reflector sheet is provided beneath the light guide plate, and a reflector sheet fixing glue is provided between the reflector sheet and the light guide plate.

9. The backlight module according to claim 1, wherein the number of the position avoiding slots is equal to the number of the LED lamps, and each of the LED lamps is disposed in a position avoiding slot at a corresponding position.

10. The backlight module according to claim 1, wherein a circuit board fixing glue is provided between the flexible printed circuit board and the light guide plate.

11. A display device, comprising a backlight module, the backlight module comprising a light guide plate and a lamp bar, the lamp bar comprising a flexible printed circuit board and a plurality of LED lamps fixed onto the flexible printed circuit board, wherein at least one position avoiding slot is provided in an edge region of the light guide plate, the LED lamps are located inside the position avoiding slot, and the flexible printed circuit board is located above the light guide plate and fixedly attached to a position of the position avoiding slot.

12. The display device according to claim 11, further comprising an optical film layer provided above the light guide plate.

13. The display device according to claim 12, wherein a position defining structure is provided at a peripheral position of the optical film layer, and the position defining structure is used for preventing the optical film layer from moving.

14. The display device according to claim 13, wherein all of the position avoiding slot(s) is/are provided at one side of the edge region of the light guide plate, and the position defining structure is provided at other three sides of the edge region of the light guide plate.

15. The display device according to claim 13, wherein the position defining structure and the light guide plate are formed integrally.

16. The display device according to claim 12, further comprising a shading tape covering a side surface of the light guide plate.

17. The display device according to claim 16, wherein the shading tape also covers an edge region of the optical film layer.

18. The display device according to claim 11, further comprising a reflector sheet, wherein the reflector sheet is provided beneath the light guide plate, and a reflector sheet fixing glue is provided between the reflector sheet and the light guide plate.

19. The display device according to claim 11, wherein the number of the position avoiding slots is equal to the number of the LED lamps, and each of the LED lamps is disposed in a position avoiding slot at a corresponding position.

20. The display device according to claim 11, wherein a circuit board fixing glue is provided between the flexible printed circuit board and the light guide plate.

* * * * *